US012757097B2

(12) United States Patent
Selvaganapathy et al.

(10) Patent No.: US 12,757,097 B2
(45) Date of Patent: Oct. 6, 2026

(54) MOBILITY SUPPORT IN A COMMUNICATION NETWORK

(71) Applicant: Nokia Technologies Oy, Espoo (FI)

(72) Inventors: Srinivasan Selvaganapathy, Bangalore (IN); Ahmad Awada, Munich (DE); Halit Murat Gürsu, Munich (DE); Umur Karabulut, Munich (DE); Jedrzej Stanczak, Wroclaw (PL); Amaanat Ali, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/041,542

(22) Filed: Jan. 30, 2025

(65) Prior Publication Data

US 2025/0324343 A1 Oct. 16, 2025

Related U.S. Application Data

(63) Continuation of application No. PCT/EP2023/071626, filed on Aug. 4, 2023.

(30) Foreign Application Priority Data

Aug. 10, 2022 (IN) ............................ 202241045700

(51) Int. Cl.
*H04W 36/00* (2009.01)
*H04W 36/36* (2009.01)

(52) U.S. Cl.
CPC ..... *H04W 36/362* (2023.05); *H04W 36/0085* (2018.08)

(58) Field of Classification Search
CPC ....... H04W 36/0083; H04W 36/00833; H04W 36/00837; H04W 36/00838;
(Continued)

(56) References Cited

U.S. PATENT DOCUMENTS

2015/0189574 A1* 7/2015 Ng ...................... H04W 52/245 370/254
2022/0174593 A1* 6/2022 Teyeb .................. H04W 24/08
(Continued)

FOREIGN PATENT DOCUMENTS

JP 2011254466 A * 12/2011
WO WO-2021029059 A1 * 2/2021 ............ H04W 36/08
(Continued)

OTHER PUBLICATIONS

Office action received for corresponding European Patent Application No. 23754218.8, dated Apr. 15, 2025, 5 pages.
(Continued)

*Primary Examiner* — Matthew W Genack
(74) *Attorney, Agent, or Firm* — BURR & FORMAN LLP

(57) ABSTRACT

Various example aspects and embodiments relate to apparatus and methods to support mobility in a radio access network. One aspect provides user equipment comprising: at least one processor; and at least one memory storing instructions that, when executed by the at least one processor, cause the user equipment at least to: receive a radio configuration and a trigger condition to activate the radio configuration, the radio configuration being associated with a cell of a radio access network, the radio configuration allowing connection between the user equipment and the cell; receive an indication of which radio configuration associated with another cell is to be retained by the user equipment in the event that the trigger condition of the cell is met; determine when the trigger condition is met and activate the radio configuration; assess, based on the received indication, which radio configuration associated with another target cell to retain; and communicate which radio configuration associated with another cell has been retained to the radio access network.

14 Claims, 2 Drawing Sheets

(58) Field of Classification Search
CPC ......... H04W 36/0085; H04W 36/0088; H04W 36/0094; H04W 36/34; H04W 36/36; H04W 36/362; H04W 36/38; H04W 36/385
See application file for complete search history.

(56) References Cited

U.S. PATENT DOCUMENTS

| | | | | |
|---|---|---|---|---|
| 2022/0322418 | A1* | 10/2022 | Kim | H04L 1/0008 |
| 2023/0262541 | A1* | 8/2023 | Ozturk | H04W 36/0058 370/331 |

FOREIGN PATENT DOCUMENTS

| | | | |
|---|---|---|---|
| WO | 2022/028756 | A1 | 2/2022 |
| WO | 2023010385 | A1 | 2/2023 |

OTHER PUBLICATIONS

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.
"Msc-generator", Sourceforge, Retrieved on Feb. 12, 2025, Webpage available at : https://sourceforge.net/projects/msc-generator/
International Search Report and Written Opinion received for corresponding Patent Cooperation Treaty Application No. PCT/EP2023/071626, dated Nov. 14, 2023, 14 pages.
"NR-DC with selective activation", 3GPP TSG-RAN WG3 Meeting #117-e, R3-224521, Agenda: 14.4, Ericsson, Aug. 15-24, 2022, 3 pages.
"Discussion on NR-DC with selective activation of the cell groups", 3GPP TSG-RAN WG3 #117-e, R3-224271, Agenda: 14.4, ZTE, Aug. 15-24, 2022, 3 pages.
Office action received for corresponding Japanese Patent Application No. 2025-507606, dated Sep. 18, 2025, 5 pages of office action and 6 pages of translation available.

* cited by examiner

MOBILITY SUPPORT IN A COMMUNICATION NETWORK

TECHNOLOGICAL FIELD

Various example embodiments relate to apparatus and methods to support mobility in a radio access network.

BACKGROUND

In a radio access network, radio coverage is provided to user equipment (UE), by geographical area. A network access node, for example, a base station, is located in each geographical area to support one or more cells of radio coverage. User equipment in the area served or covered by a network access node communicates with the radio access network via one or more radio link with the network access node.

User equipment can move between cells of radio coverage within the radio access network. When in a connected state a user equipment can move between cells, and there can be a need to handover communication occurring with user equipment between cells of the radio access network to maintain a continuity of service. In other words, there is a need for nodes of a network to be configured to support user equipment mobility events within the network.

Methods and apparatus are needed to support mobility events within a radio access network.

BRIEF SUMMARY

The scope of protection sought for various embodiments of the invention is set out in the independent claims. The arrangements, examples and features, if any, described in this specification that do not fall under the scope of the independent claims are to be interpreted as examples useful for understanding various embodiments of the invention.

According to various, but not necessarily all, embodiments of the invention there is provided user equipment comprising: at least one processor; and at least one memory storing instructions that, when executed by the at least one processor, cause the user equipment at least to: receive a radio configuration and a trigger condition to activate the radio configuration, the radio configuration being associated with a cell of a radio access network, the radio configuration allowing connection between the user equipment and the cell; receive an indication of which radio configuration associated with another cell is to be retained by the user equipment in the event that the trigger condition of the cell is met; determine when the trigger condition is met and activate the radio configuration; assess, based on the received indication, which radio configuration associated with another target cell to retain; and communicate which radio configuration associated with another cell has been retained to the radio access network.

In some example embodiments, the cell comprises a target cell.

In some example embodiments, the another cell comprises a cell which served the user equipment prior to activation of the radio configuration.

In some example embodiments, the received indication comprises an indication received from a serving central master node.

In some example embodiments, the received indication comprises a list of one or more other cells selected to be of relevance to the cell.

In some example embodiments, the received indication comprises a list of one or more other cells which are neighbour cells to the cell.

In some example embodiments, the received indication comprises a measurement configuration to perform measurement related to at least a sub-set of other cells in the event that the trigger condition of the cell is met; and the assessing comprises performing the configured measurement.

In some example embodiments, the measurement configuration comprises a comparison of radio signal of the another cell against a predetermined threshold.

In some example embodiments, the measurement configuration comprises a comparison of radio signal of the another cell against a radio signal of the cell.

In some example embodiments, communicating comprises: transmitting a list of the another cells for which the radio configuration has been retained to the network.

In some example embodiments, communicating comprises: transmitting an indication of cells for which the radio configuration has been released to the network.

In some example embodiments, the radio configuration comprises: configuration of the user equipment, cell and another cell for Conditional Primary Cell of Secondary Cell Group Addition or Change CPAC in a New Radio Dual Connectivity radio access network.

According to various, but not necessarily all, example embodiments of the invention there is provided a user equipment method comprising: receiving a radio configuration and a trigger condition to activate the radio configuration, the radio configuration being associated with a cell of a radio access network, the radio configuration allowing connection between the user equipment and the cell; receiving an indication of which radio configuration associated with another cell is to be retained by the user equipment in the event that the trigger condition of the cell is met; determining when the trigger condition is met and activating the radio configuration; assessing, based on the received indication, which radio configuration associated with another cell to retain; and communicating which radio configuration associated with another cell has been retained to the radio access network.

In some example embodiments, the cell comprises a target cell.

In some example embodiments, the another cell comprises a cell which served the user equipment prior to activation of the radio configuration.

In some example embodiments, the received indication comprises an indication received from a serving central master node.

In some example embodiments, the received indication comprises a list of one or more other cells selected to be of relevance to the cell.

In some example embodiments, the received indication comprises a list of one or more other cells which are neighbour cells to the cell.

In some example embodiments, the received indication comprises a measurement configuration to perform measurement related to at least a sub-set of other cells in the event that the trigger condition of the cell is met; and the assessing comprises performing the configured measurement.

In some example embodiments, the measurement configuration comprises a comparison of radio signal of the another cell against a predetermined threshold.

In some example embodiments, the measurement configuration comprises a comparison of radio signal of the another cell against a radio signal of the cell.

In some example embodiments, communicating comprises: transmitting a list of the another cells for which the radio configuration has been retained to the network.

In some example embodiments, communicating comprises: transmitting an indication of cells for which the radio configuration has been released to the network.

In some example embodiments, the radio configuration comprises: configuration of the user equipment, cell and another cell for Conditional Primary Cell of Secondary Cell Group Addition or Change CPAC in a New Radio Dual Connectivity radio access network.

According to various, but not necessarily all, example embodiments of the invention there is provided a network node comprising at least one processor; and at least one memory storing instructions that, when executed by the at least one processor, cause the user equipment at least to: determine a radio configuration and a trigger condition to activate the radio configuration, the radio configuration being associated with a cell of a radio access network, the radio configuration allowing connection between a user equipment and the cell; evaluate which radio configuration associated with another cell is to be retained by the user equipment in the event that the trigger condition of the cell is met; and transmit the radio configuration, trigger condition and evaluation to the user equipment.

In some example embodiments, evaluating comprises: requesting neighbour cell information from the cell, and selecting, from received neighbour cell information, a list of other cells for which to maintain radio configuration information in relation to for the cell.

In some example embodiments, evaluating comprises: requesting mobility history from the cell, and selecting, from received mobility history, a list of other cells for which to maintain radio configuration information for the cell.

In some example embodiments, evaluating comprises: selecting a measurement configuration to transmit to the user equipment.

In some example embodiments, the measurement configuration comprises: a predetermined threshold radio signal strength received from a cell.

In some example embodiments, the measurement configuration comprises: a predetermined difference between radio signal strength received from another cell compared to the cell.

In some example embodiments, the network node comprises a master control network node.

According to various, but not necessarily all, example embodiments of the invention there is provided a method performed by a network node the method comprising: determining a radio configuration and a trigger condition to activate the radio configuration, the radio configuration being associated with a cell of a radio access network, the radio configuration allowing connection between a user equipment and the cell; evaluating which radio configuration associated with another cell is to be retained by the user equipment in the event that the trigger condition of the cell is met; and transmitting the radio configuration, trigger condition and evaluation to the user equipment.

In some example embodiments, evaluating comprises: requesting neighbour cell information from the cell, and selecting, from received neighbour cell information, a list of other cells for which to maintain radio configuration information in relation to for the cell.

In some example embodiments, evaluating comprises: requesting mobility history from the cell, and selecting, from received mobility history, a list of other cells for which to maintain radio configuration information for the cell.

In some example embodiments, evaluating comprises: selecting a measurement configuration to transmit to the user equipment.

In some example embodiments, the measurement configuration comprises: a predetermined threshold radio signal strength received from a cell.

In some example embodiments, the measurement configuration comprises: a predetermined difference between radio signal strength received from another cell compared to the cell.

In some example embodiments, the network node comprises a master control network node.

According to various, but not necessarily all, example embodiments of the invention there is provided a network node supporting a cell of a radio access network comprising at least one processor; and at least one memory storing instructions that, when executed by the at least one processor, cause the user equipment at least to: receive a radio configuration associated with the cell, the radio configuration allowing connection between a user equipment and the cell; receive a request for an indication of other cells of relevance to the cell; determine which other cells are of relevance to the cell; and return a response to the request based on the determination.

In some example embodiments, determining which other cells are of relevance comprises determining a set of neighbour cells of the cell.

In some example embodiments, determining which other cells are of relevance comprises determining mobility history of the cell.

In some example embodiments, the network node comprises a secondary network node.

According to various, but not necessarily all, example embodiments of the invention there is provided a method performed by a network node supporting a cell of a radio access network, the method comprising: receiving a radio configuration associated with the cell, the radio configuration allowing connection between a user equipment and the cell; receiving a request for an indication of other cells of relevance to the cell; determining which other cells are of relevance to the target cell; and returning a response to the request based on the determination.

In some example embodiments, determining which other cells are of relevance comprises determining a set of neighbour cells of the cell.

In some example embodiments, determining which other cells are of relevance comprises determining mobility history of the cell.

In some example embodiments, the network node comprises a secondary network node.

According to various, but not necessarily all, example embodiments of the invention there is provided a computer program product which, when executed by a processor on an apparatus, is operable to control the apparatus to perform an embodiment or further embodiment.

According to various, but not necessarily all, example embodiments of the invention there is provided user equipment, comprising means configured to receive a radio configuration and a trigger condition to activate the radio configuration, the radio configuration being associated with a cell of a radio access network, the radio configuration allowing connection between the user equipment and the cell; means configured to receive an indication of which radio configuration associated with another cell is to be retained by the user equipment in the event that the trigger condition of the cell is met; means configured to determine when the trigger condition is met and activate the radio configuration; means to assess, based on the received indication, which radio configuration associated with another target cell to retain; and means to communicate which radio configuration associated with another cell has been retained to the radio access network.

According to various, but not necessarily all, example embodiments of the invention there is provided a network node comprising: means configured to determine a radio configuration and a trigger condition to activate the radio configuration, the radio configuration being associated with a cell of a radio access network, the radio configuration allowing connection between a user equipment and the cell; means configured to evaluate which radio configuration associated with another cell is to be retained by the user equipment in the event that the trigger condition of the cell is met; and means configured to transmit the radio configuration, trigger condition and evaluation to the user equipment.

According to various, but not necessarily all, example embodiments of the invention there is provided a network node supporting a cell of a radio access network comprising: means configured to receive a radio configuration associated with the cell, the radio configuration allowing connection between a user equipment and the cell; means configured to receive a request for an indication of other cells of relevance to the cell; and means configured to determine which other cells are of relevance to the cell; and return a response to the request based on the determination.

According to various, but not necessarily all, example embodiments of the invention there is provided user equipment, comprising circuitry configured to receive a radio configuration and a trigger condition to activate the radio configuration, the radio configuration being associated with a cell of a radio access network, the radio configuration allowing connection between the user equipment and the cell; circuitry configured to receive an indication of which radio configuration associated with another cell is to be retained by the user equipment in the event that the trigger condition of the cell is met; circuitry configured to determine when the trigger condition is met and activate the radio configuration; means to assess, based on the received indication, which radio configuration associated with another target cell to retain; and circuitry configured to communicate which radio configuration associated with another cell has been retained to the radio access network.

According to various, but not necessarily all, example embodiments of the invention there is provided a network node comprising: circuitry configured to determine a radio configuration and a trigger condition to activate the radio configuration, the radio configuration being associated with a cell of a radio access network, the radio configuration allowing connection between a user equipment and the cell; circuitry configured to evaluate which radio configuration associated with another cell is to be retained by the user equipment in the event that the trigger condition of the cell is met; and circuitry configured to transmit the radio configuration, trigger condition and evaluation to the user equipment.

According to various, but not necessarily all, example embodiments of the invention there is provided a network node supporting a cell of a radio access network comprising: circuitry configured to receive a radio configuration associated with the cell, the radio configuration allowing connection between a user equipment and the cell; circuitry configured to receive a request for an indication of other cells of relevance to the cell; and circuitry configured to determine which other cells are of relevance to the cell; and return a response to the request based on the determination.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which.

DETAILED DESCRIPTION

Figure 1:
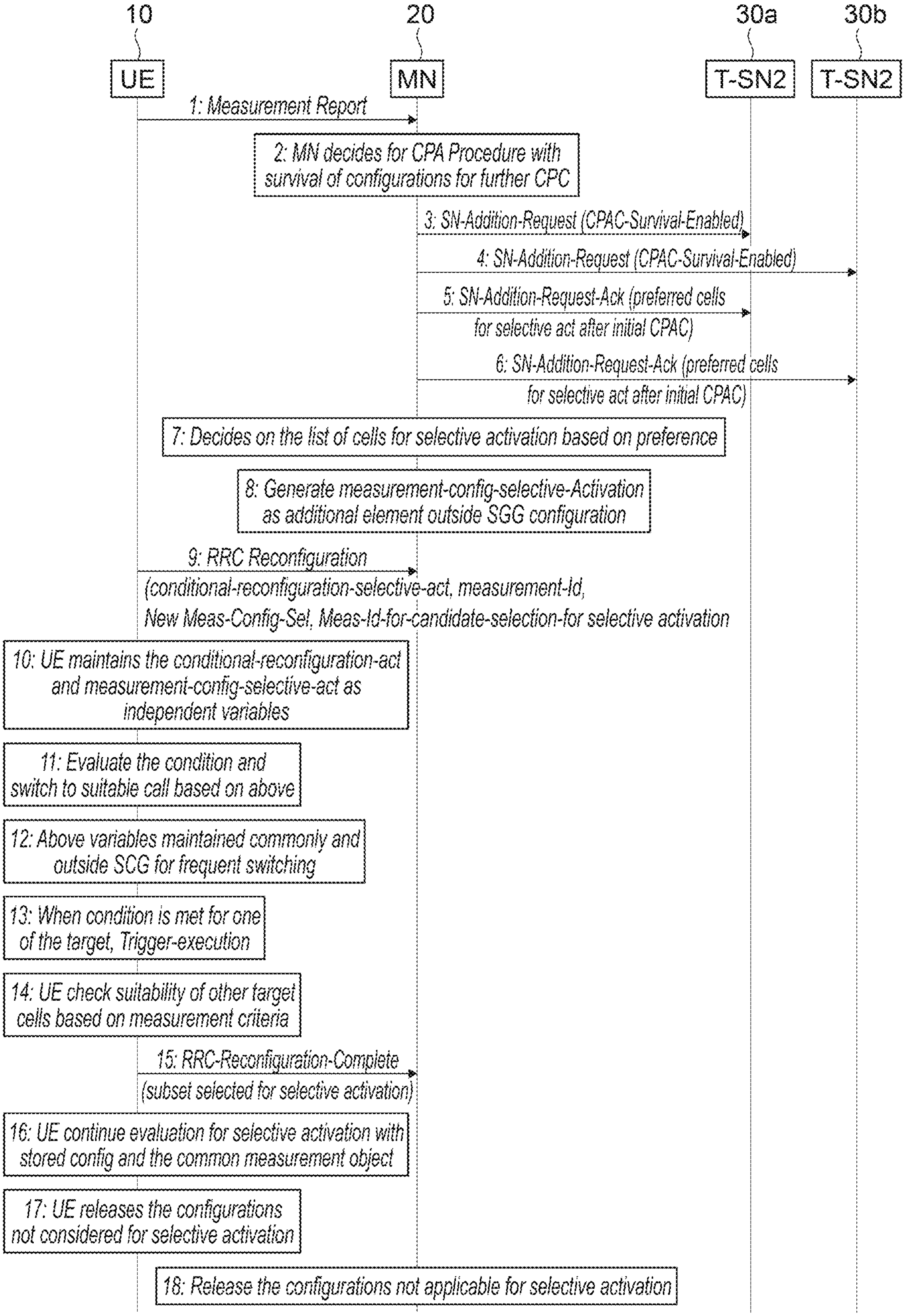
FIG. 1 is a signalling diagram illustrating an example embodiment of the subject matter described herein.

Before discussing the example embodiments in any more detail, first an overview will be provided.

Main components of a radio access network include user equipment (UE) which may be located anywhere within the network. Some of the UE may be free to roam through the network. Network access nodes, for example, base stations, are provided which support areas of radio coverage in cells within the radio access network. A number of such network access nodes are provided and are distributed, typically geographically, in order to provide a wide area of radio coverage to user equipment.

When user equipment is within a cell supported by a network access node, communication may be established between the user equipment and the network using associated radio links.

As user equipment roam through the radio access network they may move between different cells of radio coverage. The cells may be supported by differing, or the same, network access node(s). In order to ensure continuity of service to user equipment when in active use, a radio access network operates to support user equipment mobility by handing over communication configurations as the radio environment experienced by the user equipment changes.

It is recognised that as radio access networks continue to evolve, it may be useful to adapt or introduce procedures which support user equipment mobility. For example, support for user equipment mobility is also of relevance if user equipment is operating within a Dual Connectivity (DC) wireless communication network. If operating in DC, a UE is connected to a Master Node (MN) and Secondary Node (SN). The MN is a network access node (base station) controlling Master Cell Group (MCG). The MCG consists of a Primary Cell (PCell) of MCG and set of one or more Secondary Cells (SCells). The SN is a network access node (base station) which controls a Secondary Cell Group (SCG). The SCG consists of a Primary Cell of SCG (PSCell) and a set of one or more Secondary Cells (SCells). As a radio condition around a DC UE evolves, one or more cell groups may be changed to maintain continuity of service to the UE.

One way in which mobility is enhanced is to provide mechanisms and procedures which recognise that handover may be required and take action in advance of a handover condition being met. In such scenarios, known as conditional handover, some action is initiated when a first set of conditions indicative of a likely handover event are met. Such action may include pre-configuration of various nodes and cells in a network to support handover if, or when, a handover condition is met. Such Conditional Handover (CHO) arrangements may require that various nodes or cells within a network use or hold resource ready to support a handover if/when the handover condition is met.

By way of example, a conditional mobility event in a NR-DC wireless communication network is described: PSCell addition (or PSCell change) occurs when a network triggers PSCell addition (or change) of a SN based on a measurement report that is sent by the UE. Having received such a measurement report which initiates the process, the network is configured to trigger preparation of a target SN. If not operating according to conditional handover techniques, after sending the measurement report a UE needs to wait to receive a command from the network to add or change a PSCell. The delay can have an impact on UE throughput since, if a SN is being added, until the addition the UE is unable to leverage the high capacity associated with use of a SN and, in case of SN change, the UE will be served for a longer time by a SN having lower radio quality. Conditional handover, for example, Conditional PSCell Addition and Conditional PSCell Change (CPAC) allows the UE to perform access to a target SN without delay when the handover condition is met.

In the event that the handover condition is met at a particular candidate target network node, the unused resource held in expectation of potential handover to other candidate network nodes will typically be released. According to some conditional mobility features, for example, Conditional PSCell Addition and Conditional PSCell Change (CPAC) and, for example, Conditional Handover (CHO) any conditional configurations held at various nodes within a network are released after CHO/CPAC execution. In a case where a UE subsequently moves, for example, from a radio region best covered by the new serving cell to one of the other target cells which may have already been "prepared" as part of the original conditional configuration process, the whole set of CPAC or CHO preparation together with associated signalling overhead and RRC signalling needs to be performed again. That allows new conditional configuration(s) that are needed for possible subsequent cell changes to be provided to network nodes as appropriate. Such an approach may be an inefficient use of resource and the need to perform additional configuration steps may delay support for UE having fast mobility across a group of cells.

Aspects and embodiments recognise that it may be possible to provide mechanisms and procedures which allow retention of conditional mobility signalling and configuration to support efficient overall resource use within a network.

Whilst described in relation to a New Radio (NR) Dual Connectivity wireless communication system, it will be appreciated that the principles underlying the described aspects and embodiments may be applied to various mobility problems within a wireless communication network where preparatory information is sent to one or more node within the network, and where that preparatory information may continue to have relevance to ongoing network operation.

It will be appreciated that maintaining and retaining all configuration information at one or mode nodes, rather than releasing can itself be an inefficient use of resource, and therefore some compromise is required to achieve a balance between releasing and retaining. Aspects and embodiments may provide arrangements for use in conditional mobility events. Conditional mobility events are ones according to which, for example, storage of multiple configurations at UE is possible to enable selective activations. Such multiple configurations may, for example, include multiple cell group configurations, or target cell configurations. According to conditional mobility events, a configuration change at a node (selective activation) can be completed with minimum interruption and preferably no, or minimum, additional reconfiguration. Conditional handover is such that a configuration selection occurs via RRC or lower layers based on measured or detected radio conditions or other similar criteria. For conditional activation among set of cell-groups or set of configurations, there is typically a common measurement-configuration for the handover or activation criteria, unaffected by the cell-change.

Aspects and embodiments recognise that whilst retention of conditional mobility signalling and configuration at a node, for example, UE or network access node(s) within a network, can be helpful to possible subsequent changes in configuration, it also leads to resource reservation in all possible target cells for a longer timer. That ongoing resource reservation can be detrimental to overall network operation and aspects and embodiments recognise that the impact of such ongoing resource reservation can be mitigated if one or more steps are taken to try and ensure that the configurations maintained or retained are those which are more likely to be suited to possible use after an initial cell change.

Since handover target configuration(s) may be preserved for a longer time than normal the number of target cells maintained could be adjusted or reduced to avoid resource reservation for the longer time in all target cells. By releasing some target cells, some resource is returned to the network for other use.

Aspects and embodiments provide procedures and mechanisms to support selection of those conditional configurations to be retained or maintained and which to release.

Further aspects and embodiments recognise that an associated issue may arise if configurations are retained or maintained after an initial change. In particular, the potential target cells of initial serving cell need not be same as the target cells for new serving cell to which the UE transfers. The configurations retained by a UE may account for such differences.

Accordingly, in general arrangements may provide user equipment comprising at least one processor; and at least one memory storing instructions that, when executed by the at least one processor, cause the user equipment at least to: receive a radio configuration and a trigger condition to activate the radio configuration, the radio configuration being associated with a cell of a radio access network, the radio configuration allowing connection between the user equipment and the cell; receive an indication of which radio configuration associated with another cell is to be retained by the user equipment in the event that the trigger condition of the cell is met; determine when the trigger condition is met and activate the radio configuration; assess, based on the received indication, which radio configuration associated with another target cell to retain; and communicate which radio configuration associated with another cell has been retained to the radio access network.

The received radio configuration and a trigger condition to activate the radio configuration may comprise a handover condition associated with a target cell, or a radio configuration associated with configuration of the user equipment, cell and another cell for Conditional Primary Cell of Secondary Cell Group Addition or Change CPAC in a New Radio Dual Connectivity radio access network.

The radio configuration may be associated with a target cell, which may be a primary or secondary cell of a radio access network. The radio configuration may comprise information which enables a communication link to be established between the user equipment and the cell.

The received indication of which radio configuration associated with another cell is to be retained by the user equipment in the event that the trigger condition of the cell is met may take various forms. It may comprise, in relation to each "target" cell a list of other cells, including an original serving cell, for which radio configuration should be retained when communication with the new cell is activated.

The user equipment may be configured to determine when the trigger condition is met and activate the radio configuration for the cell for which the trigger condition has been met. In other words, the cell may meet conditional handover to cell addition trigger conditions required to activate a radio configuration.

The user equipment may be configured to assess, based on information already available to it, which radio reconfigurations to retain, and which to release. That information may be received for example, from a master node, or some assessment may be made at the user equipment, based on information and/or assessment criteria from the master node. Once the various reconfigurations have been released or retained, the user equipment may be configured to communicate which radio configurations have been retained, or alternatively which have been released, to the radio access network.

Having provided a general overview, some specific embodiments are now described in relation to specifying mechanisms and procedures in, for example, New Radio (NR) Dual Connectivity, in which selective activation of cell groups, at least for a secondary cell group (SCG), may occur via layer 3 enhancements.

In other words, specific embodiments and the described implementations may be understood in relation to user equipment for accessing a radio access network, a master central node and possible target secondary nodes. The radio access network may comprise a master central node and a plurality of master distributed nodes providing radio access coverage via primary cells. The master central node is configured to control the plurality of master distributed nodes. The radio access network may further comprise a secondary central node and a secondary distributed node supporting radio access coverage via one or more secondary cells. The secondary central node is configured to control the secondary distributed node. The user equipment is configured to support dual connectivity such that the user equipment is enabled to connect concurrently to a primary distributed node providing access to a primary serving cell and a secondary distributed node providing access to a secondary serving cell.

In particular, specific described embodiments may relate to mechanisms and procedures which allow a subsequent cell group change after a first or initial cell group change. The changes in configuration may apply when transitioning from single cell to a dual cell connectivity arrangement (ie the addition of a SN) and may apply, for example, if the secondary node is changed. According to some arrangements described, procedures and mechanisms may allow a subsequent change, for example, a cell group change, to facilitated to occur without reconfiguration and re-initiation of Conditional PSCell Addition or Conditional PSCell Change information.

It will be appreciated that the techniques and procedures of the specific embodiments described may be appropriately adapted and analogous approaches may be applied to a radio access network which is not operating in dual connectivity. It is particularly envisaged that the principles described in relation to arrangement may be applied to an initial and "subsequent" mobility event, in relation to a conditional handover (CHO) scenario. In this scenario, the UE may have conditional reconfiguration information relating to handover from a serving node and associated cells to one or more possible target cell croups. Accordingly, the reconfiguration information may be held in relation to a target MCG (Master Cell Group).

The following example implementations illustrate ways in which it may be possible to decide upon a subset of initial CPAC conditional configurations which are to be maintained after execution of an initial configuration change.

Implementation One

As part of CPAC preparation, a Master Node (MN) may be configured to request that each Secondary Node (SN) provides a list of other target cells which it would like a UE to maintain information in relation to, in a case that a UE performs a change to that SN. In response to the request from the MN, a SN may be configured to return an indication of preferred target cells to be maintained for selective activation (or an indication of preferred target cells to be released) after performing an initial cell change. The information obtained by the MN can be used as assistance information in a conditional mobility event in which it is envisaged to retain or maintain some of the conditional handover reconfiguration information and resource after an initial handover has taken place.

Implementation Two

Based on the assistance information received from secondary nodes for selective activation described in relation to implementation one, a MN may be configured to generate a list of conditional configuration to be maintained after CPAC execution for each target cell configuration. That information may be passed to a UE.

Alternatively, or additionally, a MN may be configured to communicate additional measurement criteria to UE to allow for selection of which conditional configuration to maintain after CPAC execution. The additional measurement criteria may, for example, comprise a condition relating to a comparison of radio signal of a prepared target cell against a predetermined threshold; and/or a comparison of radio signal of a prepared target cell against a radio signal or one or more other prepared target cells. The condition can be used as criteria to enable a UE to select one or more target cell conditional configuration information for release after initial execution. The measurement criteria may be selected to allow release of condition configuration(s) which may no longer be of relevance for selective activation.

The additional measurement criteria may be a new measurement configuration which facilitates a comparison at the UE of the radio signals of two prepared target cells. Typically measurement configurations allow a UE to compare a measurement of a target cell radio signal against a serving cell radio signal, but the new measurement configuration will allow a target cell radio signal to be compared to another target cell radio signal. The new measurement criteria evaluation may be initiated by a UE when it is about to execute CPAC towards selected target cell. Such a delayed initiation can avoid a UE operating to process such comparisons across all target cells for every measurement evaluation.

By way of example, consider a network in which CPAC is configured with respect to target cells C2, C3 and C4 for a UE operating in DC and having a serving PSCell denoted by C1. The MN includes a new measurement-ID which contains new event (A3' or X3) defining a condition to check whether a radio measurement of each prepared target cell is not more than X dB smaller than a radio measurement of the serving cell. When UE switches from C1 to C2, the measurement-ID is evaluated based on available measurements considering C2 as serving cell. The cells (e.g. C3, C4) which meet this X3 event will be maintained as selective active set. The other cells will be released by the UE. The equivalent network release may happen in response to the UE indicating the conditional release to the network.

Implementation Three

According to this implementation, on CPAC execution, a UE may be configured to maintain the configurations and conditions for a set of cells specifically indicated by the network to be maintained for further evaluation. In other words, the UE is configured to keep the prepared target cell(s) indicated for maintenance/retention by the network. The UE may report the list of cells maintained as part of RRC-Reconfiguration complete. That report may enable target node awareness of further potential target cells for data forwarding and can support an update to selective activation configurations. Alternatively, if an explicit measurement-criteria for removal of candidate cell based on comparative threshold/offset is enabled or configured, a UE may indicate the removal of specific target configuration via RRC signalling when such condition is met after initial execution.

FIG. 1 is a signalling diagram illustrating signalling which may be implemented in accordance with some aspects and embodiments of mechanisms and procedures described above.

Signalling occurs between user equipment 10, a master node 20 and one or more possible target secondary node 30*a*, 30*b*. In the illustrated signalling diagram, two general phases of signalling occur: one phase of signalling which occurs generally between the master node 20 and the possible target secondary nodes 30*a*, 30*b*; and another phase of signalling between the master node 20 and the user equipment 10.

When operating in a wireless communication network, a UE 10 is configured to send measurement reports to the network side. In this instance, the measurement report sent by the UE 10 to master node 20 indicates that two other network access nodes may be candidates for dual connectivity, or as candidates for a secondary node, in the event that the UE 10 is already operating according to DC techniques.

In response to the measurement report from UE 10 at step S1, the master node 20 initiates, at step S2, a Conditional PSCell Addition procedure (CPA) in accordance with one implementation. The MN 20 supports a conditional mobility event in which continuation or retention of the conditional configurations occurs for further mobility after initial CPAC execution. At steps S3 and S4 the master node 20 is configured to communicate with the target secondary nodes 30*a*, 30*b*, to and requests, from each potential target secondary node 30*a*, 30*b*, assistance information in relation to cells to be maintained (or released) after initial execution of a mobility event.

At steps S5 and S6, each target secondary node 30*a*, 30*b* provides the master node 20 with an indication of a list of cells to be maintained (or released) after initial CPAC. That indication is included in SN-Addition-Req-ACK messaging. Each target secondary node 30*a*, 30*b* may be configured to provide their list of cells to be maintained or released after a normal SN addition request (without receiving the survival indication).

After receiving the indications from the candidate secondary nodes 30*a*, 30*b*, the master node 20 may be configured at step S7 to select a set of candidate cells in relation to which the conditional configuration is to be maintained after a mobility event.

In some arrangements, the list of selected cells generated by the master node may be directly used by the UE and MN to determine which conditional configurations to maintain or retain after a mobility event.

In some arrangements, the master node 20 may implement a procedure according to which the UE may take more active steps to determine which conditional configurations are maintained after an initial mobility event. If operating according to such arrangements, at step S8, the master node 20 may, as part of relaying conditional configuration signalling to user equipment 10, generate a request for the user equipment to perform additional measurement steps. In the illustrated arrangement of FIG. 1, that additional measurement report request is referred to as "measurement-config-selective activation".

A second phase of the arrangement shown comprises signalling between the master node 20 and the UE 10 in support of setting up a conditional mobility event.

According to the arrangement of FIG. 1, at step S9 the master node is configured to send UE 10 an RRC Reconfiguration message containing the selected list of cells to be maintained after each execution towards each of the target-cell. The messaging also, in this arrangement, comprises measurement criteria to be used by UE to intelligently select a sub-set of cells for each of the given target secondary cells. As described above, the measurement criteria communicated to the UE (measurement-ID) maps to A3 type event and the measurement comparison performed by the UE is a measurement against a selected target cell and other target cells (rather than a comparison against a master node).

After receiving appropriate messaging from master node 20, in the arrangement shown the UE is configured to perform various steps to support retention of conditional configuration(s) as part of a mobility event.

At step S10, the UE is configured to maintain each of the conditional reconfigurations and measurement criteria set by the network side so that they can be appropriately used for evaluation in relation to both a primary (initial) mobility event which may be triggered by an appropriate measurement report, and then in relation to what to do, and which conditional configurations to retain after execution of that initial mobility event.

At step S11, the UE may determine, based on measurement, that a condition for a mobility event, in this instance, addition of a secondary node to support DC communication, is met by one of the possible target secondary nodes 30*a*, 30*b*. The preconfiguration of the master node 20, UE 10, and secondary nodes 30*a*, 30*b*, means that the addition of the secondary node which meets the condition for the mobility event can happen promptly and without delay. At step S12, the UE may be configured to maintain in indication of the measurements instructed by the master node, such that in the event that activation of a conditional mobility event is triggered, appropriate action regarding retention of other conditional configurations can be taken.

As the UE recognises, via measurement, that a condition for addition of a secondary node is met, execution of the initial mobility event is triggered at step S13. At the time of execution of the initial mobility event, the UE 10 may be configured, at step S14, to check suitability of the other candidate (conditional) target cells based on the assistance information provided by the master node 20 and/or the measurement criteria provided by the master node 20 to the UE 10. If using the assistance information, the UE may be configured to retain conditional configuration information relating to those cells which the master node 20 selected for a given target cell. According to some arrangements, the UE may be configured to make measurements in relation to those selected cells for continued evaluation. The measurements made by the UE can be used to further filter the cells in relation to which conditional configuration information will be retained or maintained after an initial mobility event, in this instance, CPAC.

At step S15, the UE is configured to report that a mobility event has been completed to the master node, and to indicate those cells for which reconfiguration information has been retained (or released). According to some arrangements, after each mobility event, for example, CPAC execution/or and PSCell change, a UE 10 may be configured to autonomously release the CPAC configuration of some prepared target cells. In some arrangements, the release may be based on the explicit list of PSCells provided to the UE by the master node 20 in step S9. The UE may be configured to confirm release of PSCells to the network side, for example, to the master node 20 or the selected new target PSCell/SN.

At step S16, the UE has retained some conditional configuration information and can continue to monitor for a measurement event which may trigger activation of such reconfiguration, and take steps to activate such reconfiguration if appropriate.

As indicated at step S17 and S18, the UE and network are configured to release the conditional configurations which are not maintained after execution of an initial mobility event, for example, CPAC execution.

Figure 2:
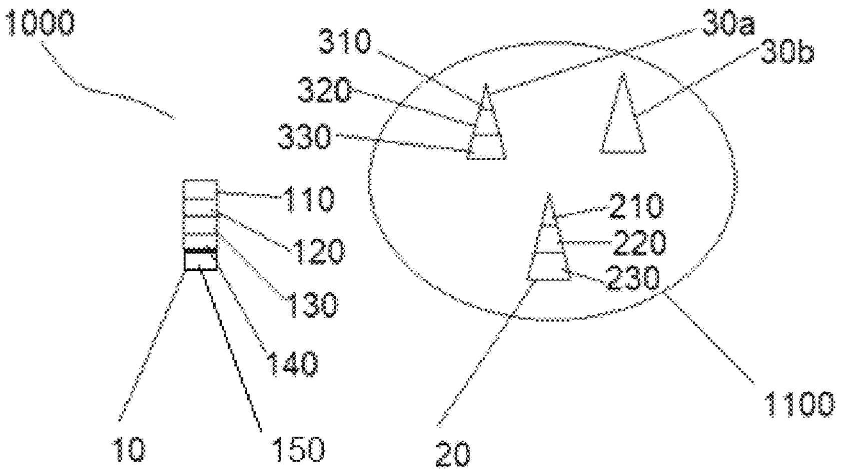
FIG. 2 shows apparatus in a communication system according to an example embodiment.

FIG. 2 shows apparatus in a communication system 1000 according to an example embodiment. In particular FIG. 2 illustrates a wireless communication network in which the core network 1100 includes a control node 20 which can communicate with one or more base station nodes 30*a*, 30*b* supporting cells in the network. The cells are configurable to support communication with user equipment 10. In some examples, the base station nodes may comprise NR base stations. A master node 20 in accordance with one example embodiment may comprise: circuitry 210 configured to determine a radio configuration and a trigger condition to activate that radio configuration, the radio configuration being associated with a cell supported by a base station 30*a*, 30*b*. The radio configuration may support connection between user equipment 10 and the cell supported by the base station 30*a*, 30*b*. The master node 20 may further comprise circuitry 220 configured to evaluate which radio configuration associated with another cell is to be retained by the user equipment in the event that the trigger condition associated with a first cell is met. The master node may also comprise circuitry configured to transmit the radio configuration, trigger condition and evaluation to the user equipment 10.

FIG. 2 further shows nodes 30*a*, 30*b* which each support cells and can be configured to support communication with user equipment 10. Each of nodes 30*a*, 30*b* comprises circuitry 310 configured to receive a radio configuration associated with the cell from the network, the radio configuration allowing connection between user equipment 10 and a cell supported by the network node 30*a*, 30*b*. The configuration may be received from node 20. The nodes 30*a*, 30*b* further comprise circuitry 320 configured to receive a request for an indication of other cells of relevance to the cell. The request may be received from node 20. The nodes 30*a*, 30*b* may further comprise circuitry 330 configured to determine which other cells are of relevance to the cell; and return a response to the request based on that determination.

FIG. 2 further shows a user equipment node 10 configured to operate within network 1000. According to one example embodiment, the user equipment node 10 may comprise circuitry 110 configured to receive a radio configuration and a trigger condition to activate the radio configuration. The radio configuration is typically associated with a cell of a radio access network. The radio configuration allows connection between the user equipment 10 and the cell.

The user equipment 10 also includes circuitry 120 configured to receive an indication of which radio configuration associated with another cell is to be retained by the user equipment in the event that the trigger condition of the cell is met.

The user equipment also comprises circuitry 130 configured to determine when the trigger condition is met and activate the radio configuration, and circuitry 140 configured to assess, based on the received indication, which radio configuration associated with another cell to retain.

The user equipment may also comprise circuitry 150 configured to communicate which radio configuration associated with another cell has been retained to the radio access network 1100.

Figure 3:
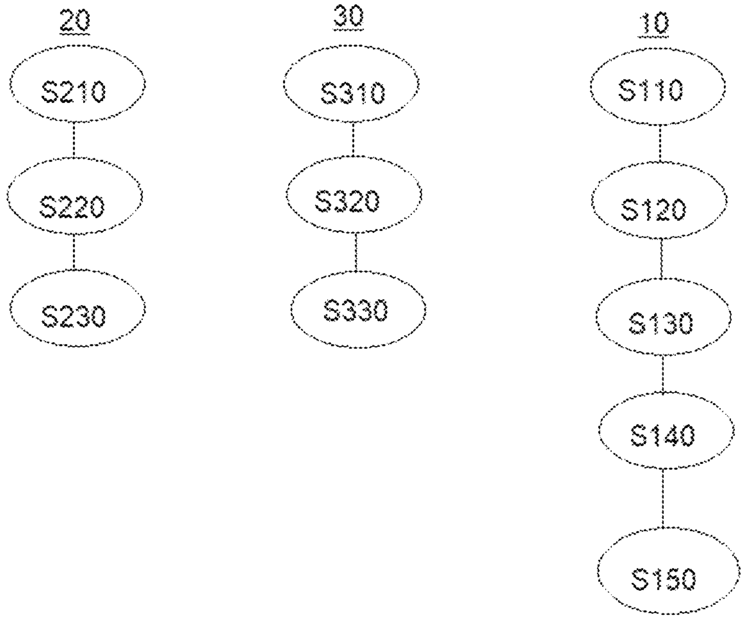
FIG. 3 shows a flow diagram illustrating steps in methods performed at network nodes according to the example embodiment shown in FIG. 2.

FIG. 3 shows a flow diagram illustrating steps in methods performed at network nodes according to the example embodiment shown in FIG. 2.

In particular, network node 20 may be configured to perform the steps of:

- S210: determining a radio configuration and a trigger condition to activate the radio configuration, the radio configuration being associated with a cell of a radio access network, the radio configuration allowing connection between a user equipment and the cell.
- S220: evaluating which radio configuration associated with another cell is to be retained by the user equipment in the event that the trigger condition of the cell is met.
- S230: transmitting the radio configuration, trigger condition and evaluation to the user equipment.

Network node 30 may be configured to perform the steps of:

- S310: receiving a radio configuration associated with the cell, the radio configuration allowing connection between a user equipment and the cell.
- S320: receiving a request for an indication of other cells of relevance to the cell.
- S330: determining which other cells are of relevance to the target cell; and returning a response to the request based on the determination.

User Equipment 10 may be configured to perform the steps of:

- S110: receiving a radio configuration and a trigger condition to activate the radio configuration, the radio configuration being associated with a cell of a radio access network, the radio configuration allowing connection between the user equipment and the cell.

S120: receiving an indication of which radio configuration associated with another cell is to be retained by the user equipment in the event that the trigger condition of the cell is met.

S130: determining when the trigger condition is met and activate the radio configuration.

S140: assessing, based on the received indication, which radio configuration associated with another cell to retain; and

S150: communicating which radio configuration associated with another cell has been retained to the radio access network.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods. The term non-transitory as used herein, is a limitation of the medium itself (i.e., tangible, not a signal) as opposed to a limitation on data storage persistency (e.g. RAM vs ROM).

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A user equipment comprising at least one processor; and at least one memory storing instructions that, when executed by the at least one processor, cause the user equipment at least to:

receive, from a master node, a conditional primary cell of a secondary cell group addition or change, CPAC, configuration and a trigger condition to activate the CPAC configuration, the CPAC configuration being associated with a target primary cell of a radio access network, the CPAC configuration allowing connection between the user equipment and the target primary cell;

receive, from the master node, a radio resource control reconfiguration message containing a list of cells other than the target primary cell for which respective CPAC configurations associated with the other cells are to be retained by the user equipment in the event that the trigger condition of the target primary cell is met;

determine when the trigger condition is met and activate the CPAC configuration, and retain, based on the received list of other cells, the CPAC configurations associated with the other cells except a CPAC configuration or CPAC configurations that the radio access network explicitly indicates to release; and report directly to the master node, in a radio resource control reconfiguration complete message, that a mobility event has been completed and indicate the other cells for which the respective CPAC configurations have been retained.

2. The user equipment according to claim 1, wherein the other cells are neighbour cells to the target primary cell.

3. The user equipment according to claim 1, configured to receive an indication that comprises a measurement configuration to perform measurement related to at least a sub-set of the other cells in the event that the trigger condition of the target primary cell is met.

4. The user equipment according to claim 3, wherein the measurement configuration comprises a comparison of a radio signal of a cell of the sub-set against a predetermined threshold.

5. The user equipment according to claim 3, wherein the measurement configuration comprises a comparison of a radio signal of a cell of the sub-set against a radio signal of the cell.

6. The user equipment according to claim 1, configured to transmit an indication of cells for which the CPAC configuration has been released to the network.

7. The user equipment according to claim 1, wherein the radio resource control reconfiguration message comprises, for each respective target primary cell of multiple target primary cells, a list of cells other than the respective target primary cell for which respective CPAC configurations associated with the other cells is to be retained by the user equipment in the event that the trigger condition of the respective target primary cell is met, and the user equipment is configured to release the CPAC configurations other than those retained.

8. A user equipment method comprising:

receiving, from a master node, a conditional primary cell of a secondary cell group addition or change, CPAC, configuration and a trigger condition to activate the CPAC configuration, the CPAC configuration being associated with a target primary cell of a radio access network, the CPAC configuration allowing connection between the user equipment and the target primary cell;

receiving, from the master node, a radio resource control reconfiguration message containing a list of cells other than the target primary cell for which respective CPAC configurations associated with the other cells is to be retained by the user equipment in the event that the trigger condition of the target primary cell is met;

determining when the trigger condition is met and activating the CPAC configuration;

retaining, based on the received list of other cells, the CPAC configurations associated with the other cells except a CPAC configuration or CPAC configurations that the radio access network explicitly indicates to release; and reporting directly to the master node, in a radio resource control reconfiguration complete message, that a mobility event has been completed and indicate the other cells for which the CPAC configurations have been retained.

9. A master network node comprising at least one processor; and at least one memory storing instructions that, when executed by the at least one processor, cause the user equipment at least to:

determine a conditional primary cell of a secondary cell group addition or change, CP AC, configuration and a trigger condition to activate the CPAC configuration, the CPAC configuration being associated with a target primary cell of a radio access network for a user equipment, the CPAC configuration allowing connection between the user equipment and the target primary cell;

evaluate which CPAC configurations associated with cells other than the target primary cell are to be retained by the user equipment in the event that the trigger condition of the target primary cell is met;

transmit the CPAC configuration, trigger condition and a list of the other cells for which respective CPAC configurations are to be retained to the user equipment, wherein the list of other cells is comprised in a radio resource control reconfiguration message that explicitly indicates a CPAC configuration or CPAC configurations that the user equipment shall release; and receive, directly from the user equipment, in a radio resource control reconfiguration complete message, a report that a mobility event has been completed and an indication of the other cells for which the respective CPAC configurations have been retained.

10. The master network node according to claim 9 wherein evaluating comprises: requesting neighbour cell information from the target primary cell, and selecting, from received neighbour cell information, the list of other cells for which to maintain the CPAC configurations.

11. The master network node according to claim 9 wherein evaluating comprises:

requesting mobility history from the target primary cell, and selecting, from the received mobility history, the list of other cells for which to maintain the CPAC configurations.

12. The master network node according to claim 9 wherein evaluating comprises: selecting a measurement configuration to transmit to the user equipment.

13. The master network node according to claim 12 wherein the measurement configuration comprises: a predetermined threshold radio signal strength received from a cell.

14. The master network node according to claim 12 wherein the measurement configuration comprises: a predetermined difference between radio signal strength received from another cell compared to the cell.

* * * * *